United States Patent
Brabson et al.

(10) Patent No.: US 9,256,872 B2
(45) Date of Patent: *Feb. 9, 2016

(54) SYSTEM AND METHOD FOR PAYMENT CARD INDUSTRY ENTERPRISE ACCOUNT NUMBER ELIMINATION

(71) Applicant: Sears Brands, L.L.C., Hoffman Estates, IL (US)

(72) Inventors: Jim Brabson, Woodridge, IL (US); Marie Ritscher, Chicago, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,123

(22) Filed: Feb. 18, 2014

(65) Prior Publication Data

US 2014/0236813 A1     Aug. 21, 2014

Related U.S. Application Data

(63) Continuation of application No. 12/476,370, filed on Jun. 2, 2009, now Pat. No. 8,651,374.

(60) Provisional application No. 61/057,992, filed on Jun. 2, 2008.

(51) Int. Cl.
| | | |
|---|---|---|
| G06K 5/00 | (2006.01) | |
| G06F 7/08 | (2006.01) | |
| G07F 19/00 | (2006.01) | |
| G06Q 40/00 | (2012.01) | |
| G06Q 20/38 | (2012.01) | |
| G06Q 20/24 | (2012.01) | |

(52) U.S. Cl.
CPC .............. *G06Q 20/385* (2013.01); *G06Q 20/24* (2013.01)

(58) Field of Classification Search
CPC ... G06Q 20/38; G06Q 20/382; G06Q 20/385; G06Q 20/383
USPC ............. 235/379–381; 705/17, 35, 39, 64, 65
See application file for complete search history.

(56) References Cited

U.S. PATENT DOCUMENTS

| | | | | |
|---|---|---|---|---|
| 7,627,531 | B2 * | 12/2009 | Breck et al. ...................... | 705/65 |
| 8,121,941 | B2 * | 2/2012 | Matthews et al. ............... | 705/39 |
| 2001/0034720 | A1 * | 10/2001 | Armes ............................ | 705/65 |
| 2002/0120587 | A1 * | 8/2002 | D'Agostino ................... | 705/78 |
| 2003/0061168 | A1 * | 3/2003 | Routhenstein .................. | 705/64 |
| 2007/0192245 | A1 * | 8/2007 | Fisher ................... | G06Q 20/02 |
| | | | | 705/39 |

\* cited by examiner

*Primary Examiner* — Thien M Le
*Assistant Examiner* — April Taylor
(74) *Attorney, Agent, or Firm* — McAndrews, Held & Malloy, Ltd.

(57) ABSTRACT

A system and method replaces credit card numbers in systems that are customer facing with token Ids to thereby reduce exposure to credit card number theft.

16 Claims, 5 Drawing Sheets

SYSTEM AND METHOD FOR PAYMENT CARD INDUSTRY ENTERPRISE ACCOUNT NUMBER ELIMINATION

CROSS-REFERENCE TO RELATED APPLICATIONS/INCORPORATION BY REFERENCE

The present application is a continuation of U.S. application Ser. No. 12/476,370, filed Jun. 2, 2009, now U.S. Pat. No. 8,651,374, which claims benefit from and priority to U.S. Application No. 61/057,992, filed Jun. 2, 2008. The above-identified applications are hereby incorporated herein by reference in their entirety.

BACKGROUND

The Payment Card Industry ("PCI") Data Security Standard ("DSS") is a set of requirements designed to ensure that all companies that process, store, or transmit credit card information maintain a secure environment. The Payment Card Industry Security Standards Council ("PCI SSC") was launched on Sep. 7, 2006 to manage the ongoing evolution of the PCI security standards with focus on improving payment account security throughout the transaction process. The PCI DSS is administered and managed by the PCI SSC (pcisecuritystandards.org), an independent body that was created by the major payment card brands. All members of the payment card industry (financial institutions, credit card companies and merchants) must comply with these standards if they want to accept credit cards. Failure to meet compliance standards can result in fines from credit card companies and banks and even the loss of the ability to process credit cards.

There are six categories of PCI standards that must be met in order for a retailer to be deemed compliant:

Maintain a secure network (this category focuses on the actual computer network that cardholder data is exposed to, e.g., whenever any personal information about a cardholder is stored on a computer, that computer is behind a firewall and all reasonable measures have been taken to protect the computer network);

Protect cardholder data (this category focuses on how cardholder data is stored and transmitted, e.g., actual credit card numbers are transmitted/stored as encrypted data so that even if someone obtains access to the data they still will not be able to decipher the information in it);

Maintain a vulnerability management program (this category focuses on keeping computer hardware, operating systems, and software up-to-date as well as well as running regular virus scans);

Implement strong access control measures (this category focuses on limiting access to cardholder data to only those persons that need to use it, e.g., restricting physical access to cardholder information and assigning a unique identification to each person that does have access to cardholder information);

Regularly monitor and test networks (this category focuses on ensuring that networks that store cardholder data are monitored and tested regularly); and Maintain an information security policy (this category focuses on drafting and implementing a company-wide information security policy so that company employees know and understand their responsibilities with respect to cardholder data before it becomes an issue).

The first step in PCI compliance is to meet the above standards. Credit card companies and financial institutions validate that vendors are abiding by the regulations, giving them ratings based on their volume of transactions. The rating that a company receives determines the process that they must go through in order to be validated.

SUMMARY

The following describes a system and method for PCI enterprise account number elimination which functions to dramatically reduce exposure to credit card number theft by removing credit card numbers from systems that are customer facing (e.g., store point-of sale "POS" devices, eCommerce related computers, etc.) with token IDs (e.g., a reference to a credit card number) instead being stored/used. More particularly, the system and method operates by substituting in real-time a token id for a received credit card number and thereafter storing/using the token id in lieu of the credit card number.

A better understanding of the objects, advantages, features, properties and relationships of the subject system and method will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the system and method for PCI enterprise account number elimination described hereinafter reference may be had to the following drawings in which.

DETAILED DESCRIPTION

Figure 1:
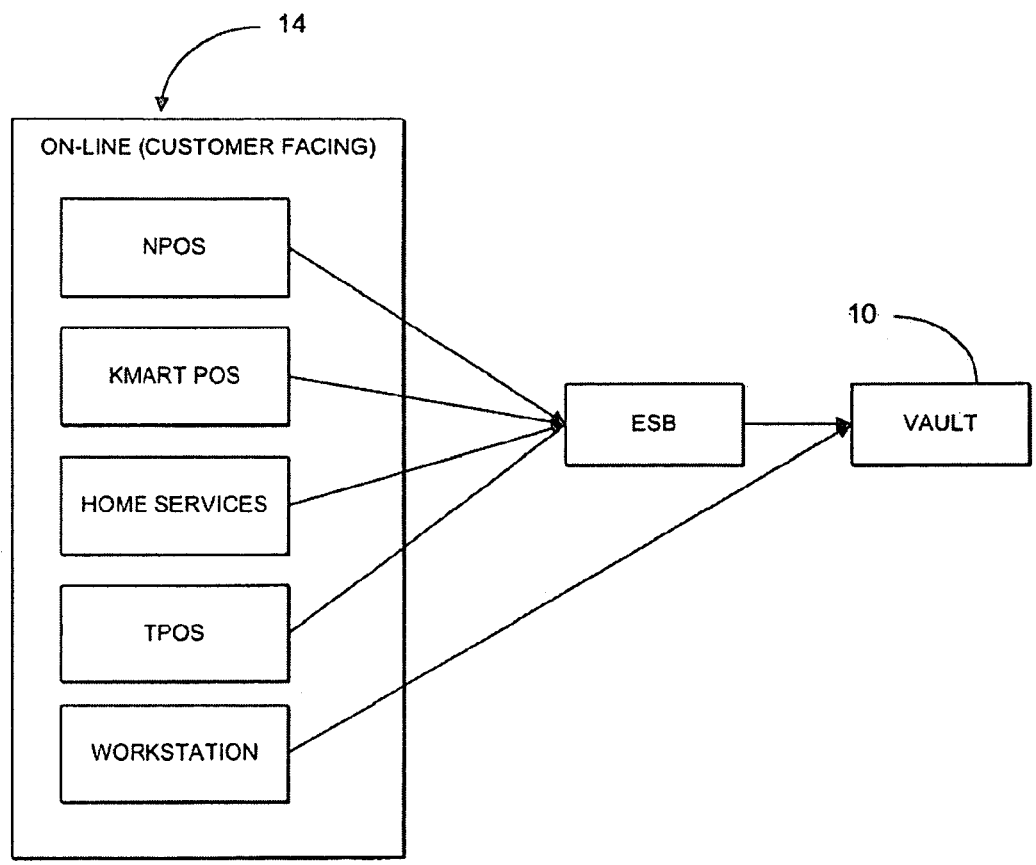
FIG. 1 is a block diagram illustrating exemplary components of an exemplary network in which the principles of the subject invention are employed.
Figure 2:
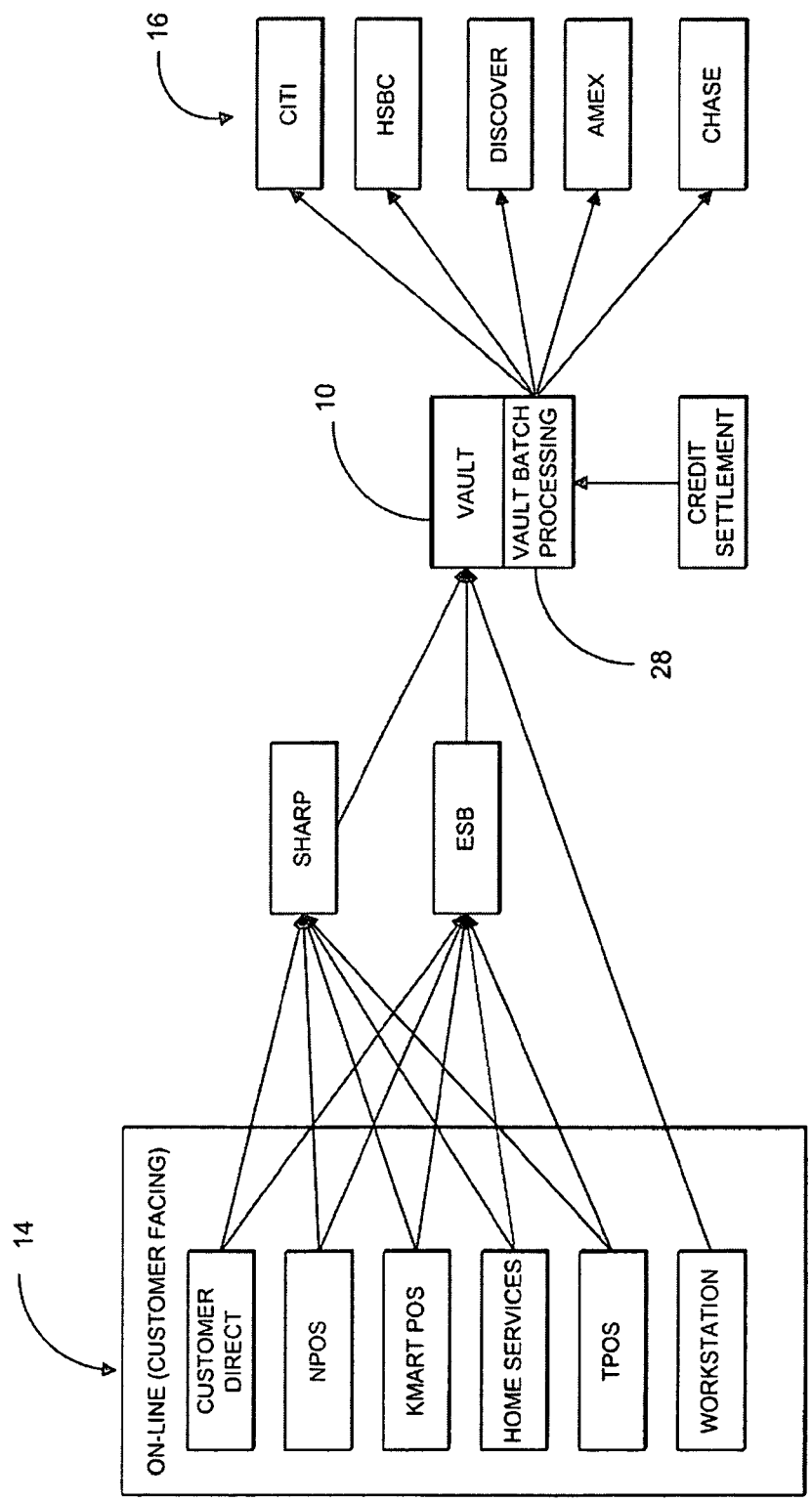
FIGS. 2-5 are block diagrams each illustrating further exemplary components of the exemplary network of FIG. 1.

With reference to the figures, this document describes a system and method for Payment Card Industry ("PCI") enterprise account number elimination. The intent of the system and method is to dramatically reduce exposure to credit card theft by removing credit card numbers from current systems that are customer facing and instead using token IDs. The token IDs function as a reference to credit card numbers. While not required, a token ID is preferably provided with as many digits as are provided on commercially issued credit cards and, furthermore, are preferably provided with a unique, authorized bank identification number ("BIN") so as not to have a number that might be provided upon a credit card. The token IDs and associated credit card number (encrypted) are also preferably stored in a single, secured, central repository.

Each customer facing application, e.g. applications 14, that uses or stores a credit card number is provided with an interface to the central, secured repository 10 (hereinafter referred to as the "Vault") in order to obtain a token ID that corresponds to a provided credit card number. In this regard, an interfacing application 14 will send either a credit card number or a Token ID to the Vault 10 and the Vault 10 will take the data's received format, convert it to the other format, and send the converted data back to the interfacing application 14. The mainframe will continue to contain the credit card number, e.g., in a tranfile, to feed any downstream applications that require the credit card number.

In the described system, all applications that function to store a credit card number will instead function to a token ID.

The credit authorization process with banking systems 16 will then be expanded to get the credit card number being authorized converted to a token ID and to then send the authorization response and token ID back to the requesting application. In this embodiment, only the Vault 10 should ultimately contain credit card numbers.

As concerns the token ID, it is preferred that the token ID: be distinguishable from and not overlap with a credit card number, i.e., have a unique, assigned BIN (e.g., first six digits); be self-checking; have minimal impact upon existing processes; and have a one-to-one relation with a credit card number, i.e., no more than one token ID can exist for each credit card number and, likewise, no more than one credit card number can be associated with a token ID.

Still further, the token ID should have enough digits for at least two billion credit card numbers over the next 10 yrs and applications should be able to identify a card type/issuing bank (BIN $1^{st}$ 6 digits) and the last 4 digits in some way, either as part of the token ID, or as stored elsewhere. In this manner, token IDs should not need to be recycled for at least 10 years. If a customer then begins using the same credit card once the token has been retired, then a new token id will be assigned.

As concerns the Vault 10, the Vault 10: must meet PCI data security standards v1.1—Requirements 3, 4, 6, 7, 8, and 10; and credit card numbers must be encrypted when stored in the Vault and, at a minimum, the encryption key should be changed annually, be safeguarded, and be inaccessible to users and system administrators. Furthermore, the Vault 10 is to be the only repository where both a credit card number (encrypted) and a corresponding token ID (reference) can both exist together for more than 24 hours. In support of POS and on-line retail, the Vault 10 must be able to sustain a peak load of 300 transactions per second in real-time, should be able to hold two billion credit card numbers, should be able to handle both real-time and batch processing, should be able to convert both from credit card number to token ID and from token ID to credit card number, and should be able to update the encryption key without an extended outage.

Yet further, the overall system should be scalable in both capacity and processing power, be capable of operations 24 hrs/day, 7 days a week, and should not store any data beyond what is necessary in order for the Vault 10 to function (i.e., provide the data required by an interfacing application), should not significantly increase the duration of a credit authorizations, meet PCI data security standards v1.1, Requirement 10, for logging, and should support real-time and batch processing and file transfer. It is also to be appreciated that a settlement team should be able to get access to the Vault 10 in order to address customer questions/issues that come from credit card issuers, e.g., Mastercard, VISA, AMEX, etc., and, as such, they will need the capability to go to the Vault 10 with a credit card number and get a Token ID in order to do research as needed. In addition, Credit card numbers persisted on sales/order entry systems should be either converted to a token ID or truncated (BIN—$1^{st}$ 6 digits and the last 4 digits can be stored, with X's or zeroes in between) within 24 hours from the time that they are initially stored and backup files in the POS systems should not contain credit card numbers. Thus, when an application or individual has the need to access the real credit card number for a customer, a request will need to be sent, with a Token ID, to the Vault in order to retrieve the credit card number. While it is desired to encrypt messages and files containing charge card numbers which are transmitted across the internal network, this is not required. The overall system may store the BIN and last 4 digits of a credit card number or the token ID in a new field on each interfacing application and, as such, interfacing systems should have the following three options: store a truncated credit card number only; store a token ID only; and/or store a truncated credit card number and a token ID.

As discussed above, the Vault 10 is a secure repository containing all credit card numbers for an enterprise and which maintains an associated "token Id" which all enterprise applications will use in lieu of the credit card number. When an application or individual has a need to access the real credit card number for a customer, a request will be sent to the Vault 10 to retrieve the credit card number. The objective is to have all applications use the token Id and never access the real credit card number unless in the context of a customer transaction. This design allows for a reduction in exposure to credit card theft by removing the credit card number from systems and housing them in a single repository. By doing this, tighter controls and monitoring can be implemented faster and easier. Once the token Id has been adopted by an application and the credit card removed, PCI certification will no longer be required by that application. While it is not required to encrypt messages and files containing card numbers which are transmitted across the internal network, the architecture may support this feature as an enhancement.

As concerns the Vault 10, credit card numbers in the Vault 10 should be encrypted in a way which is compliant with PCI standards (minimum AES 256). At a minimum, the encryption key in the Vault 10 should be changed annually. The encryption key should be safeguarded and inaccessible to users and system administrators and the encryption key should never be persisted other than where required. The Vault 10 infrastructure should be secured/isolated in a way to prevent unauthorized access from other applications, infrastructure components, and users. While it is preferable to isolate this infrastructure, but is not required if other PCI compliant safeguards are in place.

In addition, the Vault 10 should be capable of 24/7 operations and should be able to update the encryption key on the fly without an extended outage. The encryption update can span multiple days while re-keying the data. Database backups should also support 24/7 operations. Once a token id is assigned, it must never get reused and must be sufficiently backed up in real-time to ensure that no two credit card numbers map to the same token id and vice-versa. Nightly offsite backups of the database data should be taken and the Vault 10 infrastructure should be redundant in order to provide 99.8% up time. It is preferable to have near instantaneous failover to backup infrastructure/servers, but a manual failover process can be considered as long as the backup is able to come on-line within 15 minutes.

The Vault 10 should be able to hold 10 years worth of credit card/token id number pairs with a maximum estimated number of 2 billion pairs. The Vault 10 and related infrastructure should be able to sustain a real-time load of at least 300 transactions per second ("tps") real-time to meet historical credit card volumes that have been estimated as follows: Peak volume—6 m real-time transactions per day: (139 tps); peak hour: (195 tps) and Average volume—2 m real-time transactions per day: (40 tps). The Vault 10 response time (not including network latency) should be under 50 ms per on-line request. Additional load on the Vault 10 may be generated via batch processing and should be considered potentially climbing to 30 m requests per day. Architecture must be scaleable in both capacity and processing power. High speed connectivity to an infrastructure which can handle the 300 tps volume must also be available. There is a on-line web component with an estimated 50 concurrent users and 5 concurrent pages per second.

As to network capacity, the average network load-on-line (inbound from each entity store) may be estimated as 2 m messages*200 byte length*2 message types (request & response)=800 mb per day/68 mb per hr/1 mb per minute/17 k/sec. Peak network load-on-line (inbound from each entity store) may be estimated as 6 m messages*200 byte length*2 (request & response)=4.8 gb per day/204 mb per hr/3 mb per minute/51 k sec. Average Network load-batch files-may be estimated as 10 m records*200 byte length*2 (up & back)=4 Tb per day. Peak Network load-batch files (primarily internal to data center)-may be estimated as 30 m records*200 byte length*2 (up & back)=12 Tb per day. To manage the system, operational statistics should be generated real-time and at a minimum display key performance indicators and system alerts if certain conditions are encountered. The alert thresholds should be configurable. A web enabled dashboard should be available displaying the key operational statistics and alerts. This dashboard should be secured.

With respect to the overall system technical requirements, the infrastructure should conform to supported ACI platforms, e.g., AIX/Windows/SqlServer/DB2/Oracle10. The system should support both a custom application server and web application server environments, e.g., Tomcat/Apache 5.5 and Websphere 6.1. Java should be supported on the custom application server. A QA/Testing environment should also be constructed which simulates the architecture of the production environment.

Generally, the system should minimize impact on interfacing systems such as the various customer facing POS systems 14 shown in the figures. The token ID should be recognizable from a credit card number, be self checking, not overlap with credit card number, and have a 1:1 relationship with a credit card number. The token ID is preferably selected to have numbers sufficient to handle 2 billion accounts over 10 yrs.

Figure 3:
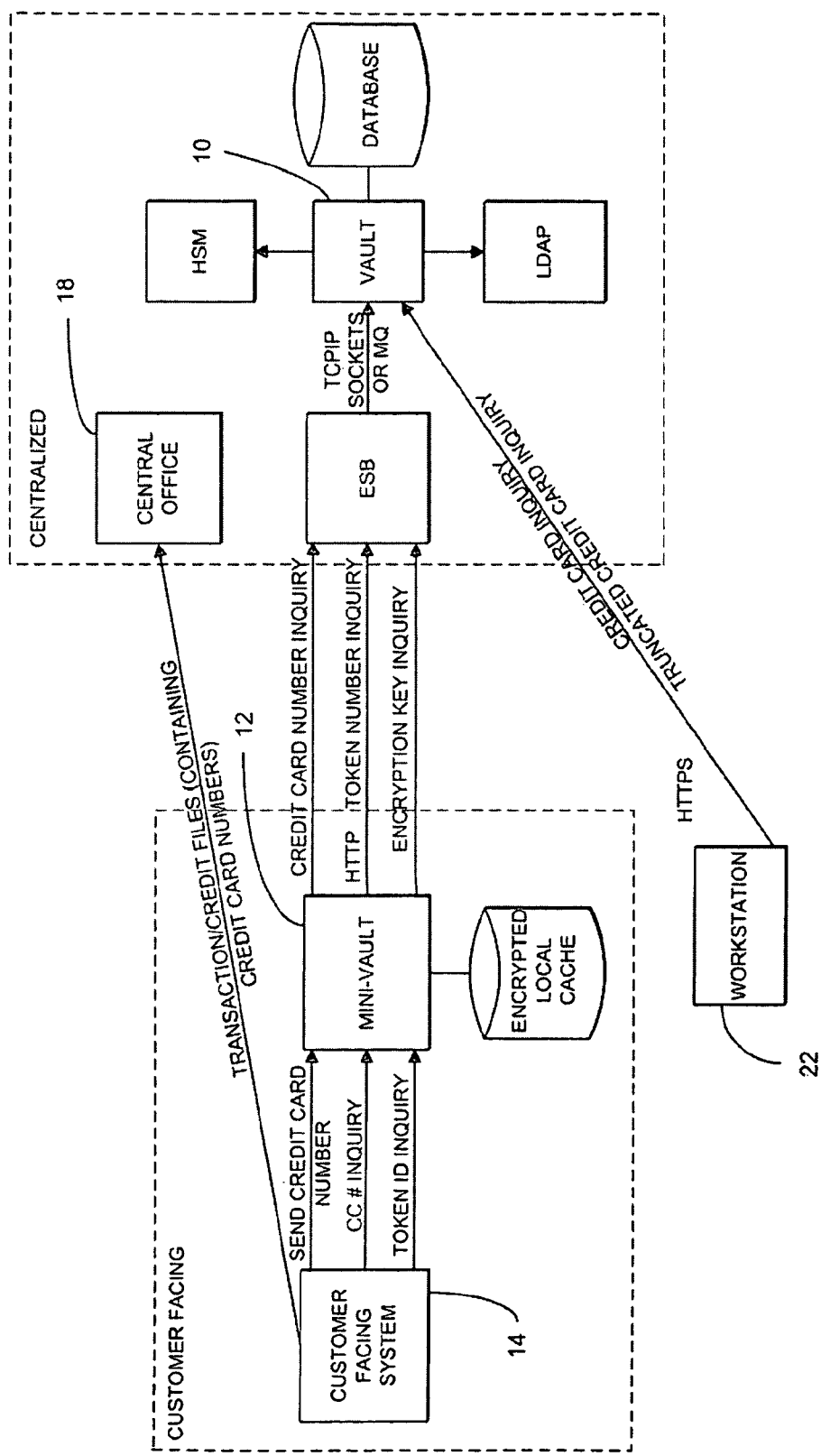
Figure 4:
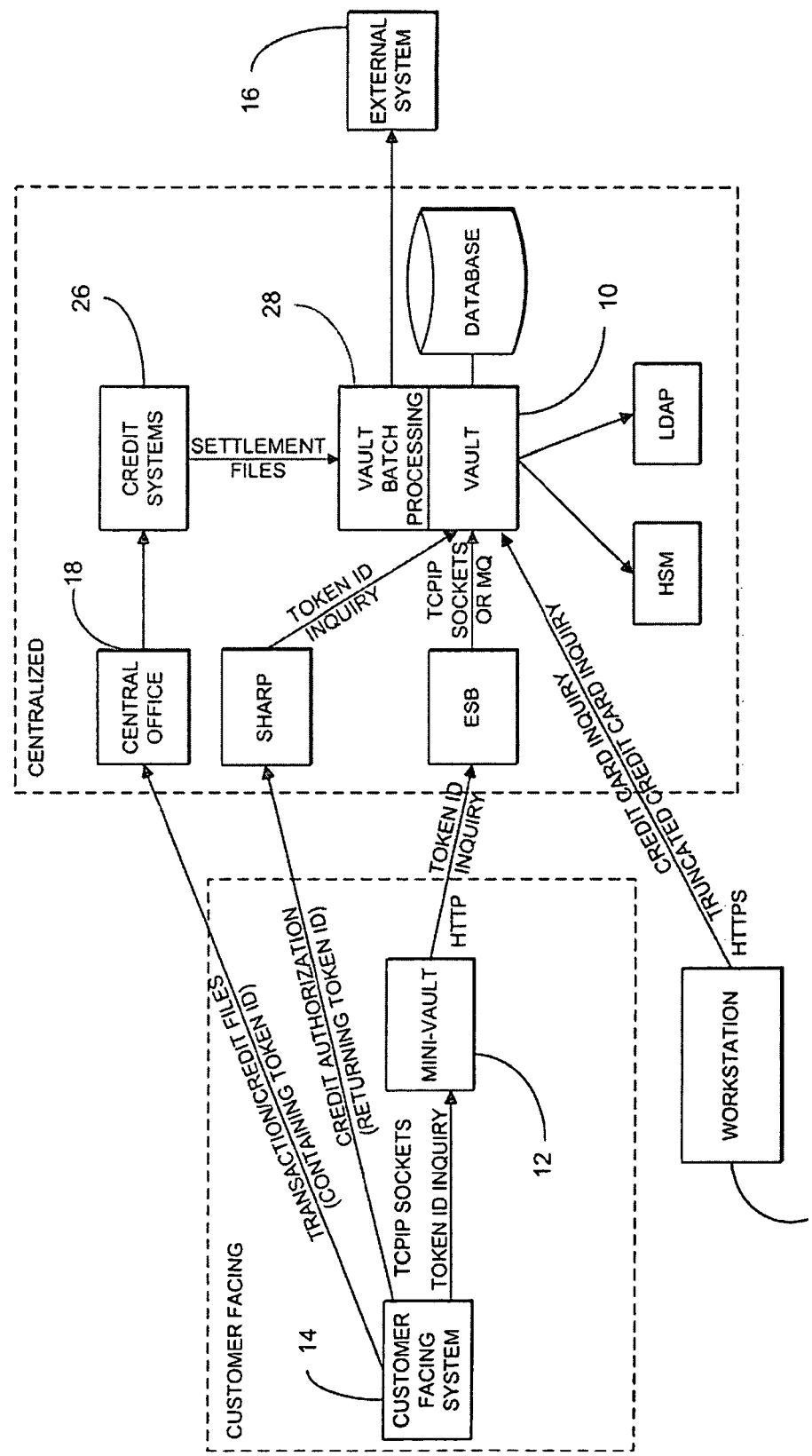

Several alternatives to the Vault 10 are contemplated. By way of example, HTTP may be used to communicate from a mini-Vault 12 (stored in connection with an individual retail location) to ESB and TCPIP sockets may be used to communicate from ESB to the Vault 10 as shown in FIG. 3. As a backup, MQ can be used. SSL or other encryption technologies for the messaging need not be implemented although consideration for future enablement should be considered in the architecture.

As shown in FIG. 3, customer facing systems 14 will be required to swap out any credit card numbers with token Ids which are persisted on their system more than 24 hours. Customer facing systems 14 will continue to pass credit card numbers to central office systems 18 and downstream systems in the transaction, credit settlement, and any other associated file. Thus, in such an embodiment, access to the Vault 10 will be via the mini-Vault 12. The mini-Vault 12 will be deployed locally, i.e., in store, to the customer facing systems application servers. When a credit authorization or transaction is completed, the credit card numbers is sent to the mini-Vault 12 asynchronously. The mini-Vault 12 will retrieve matching token Ids from the Vault 10 and caches them in local storage 20, preferably encrypted. These requests to the Vault 10 may be consolidated into messages containing up to 10 credit card numbers and sent off at intervals during the day. When the system is ready to convert their credit card numbers to token ids, they will be retrieved locally from the mini-Vault 12. If a number is not found locally, the mini-Vault 12 will communicate with the Vault 10 to retrieve it. It will be appreciated that utilizing the mini-Vault 12 has many advantages:

1. The caching of numbers in the mini-Vault 12 during the day helps to spread out the load on the Vault 10.
2. Provides faster response time during end-of-day processing.
3. Reduces overall development effort by providing a common component to all interfacing systems.
4. Tighter controls on calls to the Vault 10 and changes can be implemented must faster and easier.
5. Message encryption could be implemented in the future with less effort.

Communication to the Vault 10 will be via ESB using HTTP. ESB will communicate to the Vault using a persistent asynchronous TCPIP socket or MQ. Neither communication legs will be encrypted at this point.

An online portal 22 may also be made available on an as needed basis to allow users to type in a token Id and retrieve either the full Credit Card number or a truncated Credit Card number. Access to the portal 22 should be restricted to appropriate personnel and should use SSL for any page that contains a credit card number.

In a further embodiment, the credit authorization process will be altered so that SHARP 24 will retrieve a token Id from the Vault 10 and return it in the authorization response. Customer facing systems 14 will no longer persist the credit card number locally; instead the token Id retrieved from the credit authorization response will be saved. From that point on, only the token Id will be passed to down stream systems. In the cases that a token Id cannot be retrieved from the Vault 10 and returned in the credit authorization response customer facing systems 14 will temporarily persist the credit card number. At intervals during the day, these systems will run processes which search for credit card numbers and replace them with token Ids. The mini-Vault 12 will be used to communicate to the Vault 10 to retrieve the token Ids.

It is expected that all backend systems should be able to process normally using the Token Id in place of the credit card number. In the cases where the real credit card number is required, such as the credit settlement files sent to the external credit card companies, a new batch component called Vault Batch Processing 28 can be utilized. In this specific case, the Vault Batch Processing component 28 will handle the translation back to credit card number and transmit the file to the credit card company. The credit system 26 therefore no longer needs to hold the card number even for settlement purposes.

It will be appreciated that there may still be the need to do reverse lookups. The portal 22 may again continue to be used for authorized users and a credit card inquiry service may be provided to resolve credit card numbers from token Ids. Other than the Vault Batch Processing component 28 there will be no services that allow multiple reference numbers to be translated back to credit card numbers. If system functionality requires that a record be searched by credit card number, the recommended approach would be to convert the search subject from credit card number to token Id and search on the token Id.

The Vault 10 will thus provide the following services:
1. Token inquiry—token Id is returned for each credit Card number passed in. This inquiry will support passing in 1 to 10 credit card numbers per request;
2. Credit Card Inquiry—Credit Card Number is returned for a Token Id passed in;
3. Truncated Credit Card Inquiry—Truncated Credit Card Number is returned for a Token ID passed in; and
4. Encryption Key Inquiry—Store encryption key is returned for a specific date. A new key will be generated by the Vault 10 daily and saved for 3 days. It will be used by the mini-Vault 12 to encrypt credit card numbers stored in the mini-Vault.

A single token Td will be generated and maintained for each credit card number sent to the Vault 10. Token Ids should be reserved in the Vault 10 for 7 to 10 years as dictated by the business.

Token Ids may be constructed as a 16 digit numeric number with the first 6 digits starting with one of 3 reserved bin numbers, and the following 9 digits as a sequentially assigned number and the last digit a check digit. This number will use mod 10 or equivalent as the check digit algorithm.

A new field may also be required to be saved and passed on to the central office 18. This new field will contain the original 6 digit bin number and the last 4 digits. Many applications require this data for processing and not the entire credit card number. Passing on this information will dramatically decrease calls to the Vault 10 as well as providing required information to many systems with out compromising security.

Credit card numbers in the Vault 10 should be encrypted using a minimum of AES encryption with a 256 bit key or larger before persisting the data. Reference numbers do not need to be encrypted. The master encryption key should be stored in the existing HSM (Hardware Security Module) device used by SHARP. A master encryption key should be stored in the existing HSM and this key will be used to decrypt the working data encryption key (DEK) which will be used to encrypt the credit card number in the database. The working DEK keys will be stored in the database.

PCI requires that encryption keys need to be changed at a minimum yearly. When needed, a process should be invoked that will perform a rolling key update which can be run while the Vault 10 is on-line to users. While the encrypted data is being re-keyed, there will be records with both the old and new keys in the database. Normal processing should be able to determine which key is being used on a specific record and decrypt it using the correct key. The re-keying process may utilize only a single thread so as to not adversely impact on-line performance. Since online processing is not impacted and normal operations can continue during re-keying, this process could be scheduled to complete over the course of several days.

The Vault 10 infrastructure may utilize hardware as required, operating systems such as: AIX and Windows, and a database platform such as: SQL Server, Oracle10, DB2.

Figure 5:
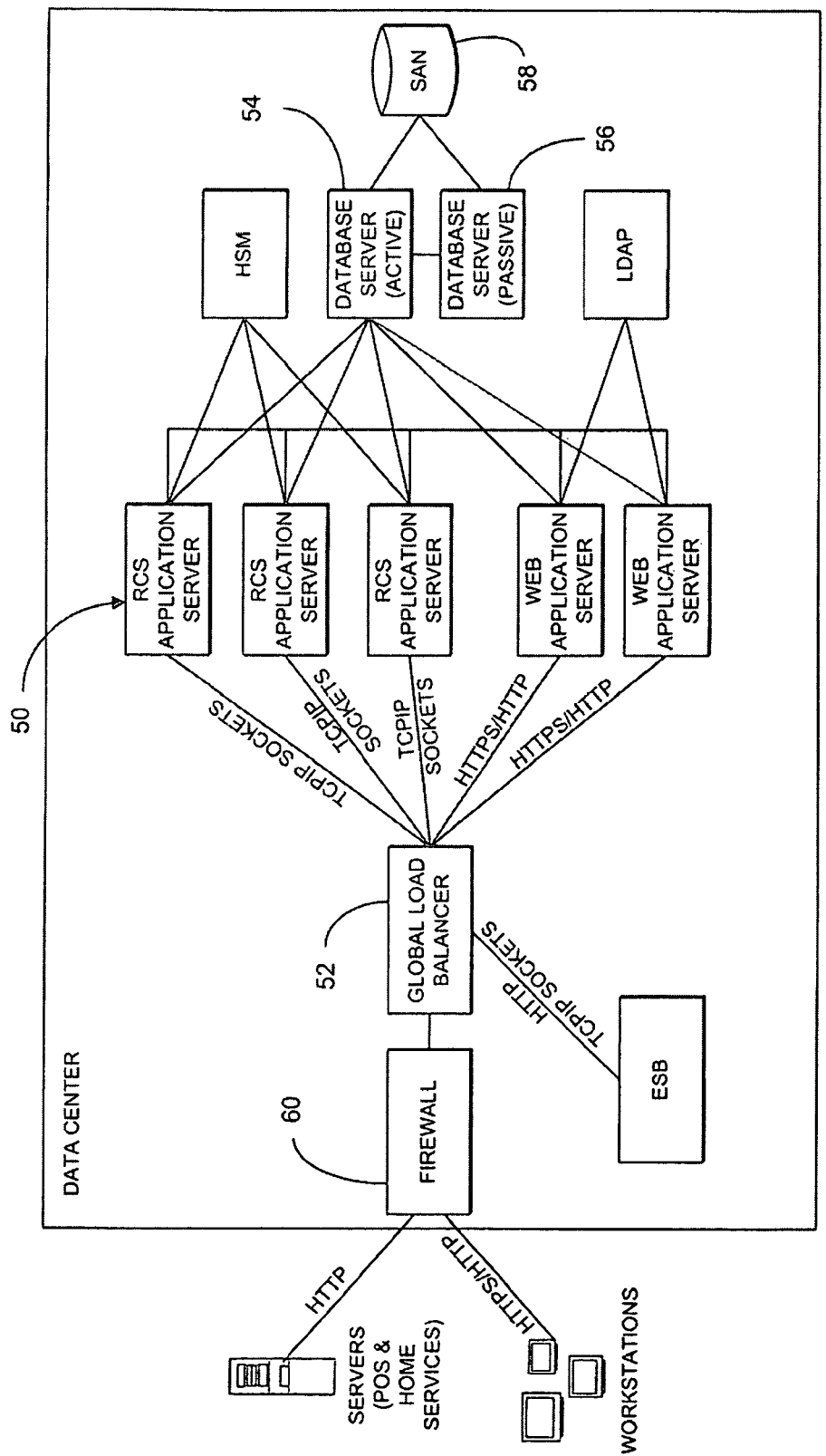

As shown in FIG. 5, it is desired to provide a redundant infrastructure by running the application on multiple application servers 50. The application servers 50 should thus load balance between the nodes using a global load balancer 52 and would be sized for the peak load+1 server (n+1). There would be an active 54 and passive 56 database server using SAN storage 58. The SAN 58 can utilize the existing infrastructure and should be redundant utilizing RAID 5 or better. Clustering software could be used to automatically manage the failover of both the application and database server nodes, although a manual failover process is acceptable. As existing network infrastructure may be utilized, including firewalls 60 and a global load balancer 52. The Vault 10 infrastructure may be setup on its own VLAN to help segregate Vault traffic on a 1 gb connection.

Because of the sensitive nature of the data and processes, application and database servers should reside on dedicated servers. The VLAN will segregate the network traffic and will be fire walled off using the existing data centers firewall infrastructure. Database storage will be on the shared SAN infrastructure, but since the credit card data is encrypted in the database, segregation of this data is not required.

The following now describes how systems may interface to the credit card Vault 10 to retrieve the token Id number. The Vault 10 is a secure repository for customer's credit card numbers which also creates and maintains an associated token Id which applications will use in lieu of the credit card number. When an application or individual has the need to access the real credit card number for a customer, a request will be sent to the Vault 10 to retrieve the credit card number. This design allows the exposure to credit card theft to be reduced by removing the Credit Card number from current systems and housing them in a single repository. By doing this, tighter controls and monitoring can be implemented faster and easier. Once the token id has been adopted by applications, PCI requirements pertaining to "data at rest" no longer apply to those applications.

As discussed, the system will comply with PCI Data Security Standard v1.1. For additional PCI compliance, upstream systems from the central back office applications should continue to receive credit card numbers. As concerns the customer facing systems, all charge card numbers persisted on the sales/order entry systems are preferred to be converted to token ids or truncated within 24 hrs, backup files in the POS systems should not contain credit card numbers (truncated Credit Card Numbers and Token Ids are not considered a Credit Card number, thus are not subject to PCI regulations), and a token Id and associated Credit Card Number are not to be stored together in the same record or message or in a way in which the two could be correlated together. Additional design considerations may be made to enable support of swapping of the credit card number with the token Id in real-time during authorization and passing on the truncated credit card number to centralized applications.

With respect to the mini-Vault 12, associated credit card numbers and token Ids should not be persisted un-encrypted together or in a way in the two can be correlated together. The Encryption Key used to encrypt local credit card numbers should be changed daily and not persisted in the file system. Cached credit card numbers should not be held for a period of more than 24 hours in the mini-Vault 12. Design considerations may be made to support the encryption of the credit card number before transmitting across the network as a future enhancement. The performance requirements of the mini-Vault 12 are selected in order to reduce the impact on ESB and token inquiry requests supporting the local caching of tokens in the mini-Vault 12 may be batched together up to 10 requests in one message.

A common mini-Vault component can be developed for use by customer facing systems to communicate with the Vault 10 and will reside on the customer facing systems server. The mini-Vault 12 may be developed using java and communicate to interfacing customer facing systems and ESB using HTTP. The mini-Vault 12 may cache reference numbers and credit card numbers locally to help distribute calls to the Vault over the day. ESB will be used to manage connections to the customer facing systems, and ESB will communicate to the Vault 10 using persistent sockets or MQ. In a further embodiment, batch systems may communicate directly with the Vault 10 using file transfers. Any real-time processing will continue to use ESB. Since network encryption is not required within the internal WAN, SSL need not be used between customer facing systems and ESB and the Vault.

As noted, the goal is to secure the systems that directly interact with the customer. These systems will thus be required to swap out all credit card numbers with a token Ids which are persisted on their system more than 24 hours. The token Id is a number retrieved from the Vault 10 which has been associated with a specific credit card number. The Token Id does not resemble the original card number and if stolen cannot be used as a credit card number.

Downstream systems may continue to receive credit card numbers in their transaction, credit settlement, and other associated files. Alternatively, downstream systems may be required to accept token Id and all customer facing systems will swap out the credit card number for the token Id number in real-time.

When a transaction containing a credit card number is completed, the credit card number should be sent to the mini-Vault 12 in real-time to be "saved" locally. The mini-Vault 12 is responsible for retrieving the matching token Id from the Vault 10 and caching this information encrypted locally. To help reduce the overall load on the network and centralized infrastructure, the Mini-Vault may consolidate requests to the Vault 10 into messages containing up to ten credit card numbers and send off at intervals during the day.

At end-of-day, when a system is ready to convert their credit card numbers to token Ids, a request may be sent to the mini-Vault 12 for each credit card number to retrieve its corresponding token Id. The mini-Vault 12 will first try to retrieve the tokens from its local cache; if not found a call will be make to the main Vault 10 to retrieve it.

If the Vault 10 is off-line and tokens are unavailable locally during the EOD conversion process, the actual credit card number can be temporarily persisted. During the next day's EOD processing, ALL credit card numbers including the previous days numbers should be detected and converted to token Ids.

The mini-Vault 12 may persist a single days worth of credit card numbers and associated token Ids locally. This data will be encrypted to PCI standards and use a new encryption key every day. At a specific time every day, the mini-Vault 12 may purge its previous day's cached data and retrieve a new encryption key from the Vault 10.

If a system needs to retrieve the actual credit card number after it has been converted to a token id, a service will be available from the mini-Vault 12 to do this conversion real-time. Processes such as audit re-entry and re-sending of credit settlement data have already been identified as potential users of this functionality, there may be more.

In cases where a token Id cannot be retrieved from the Vault 10 and returned in the credit authorization response; customer facing systems will temporarily persist the Credit Card number. At intervals during the day, these systems will run processes which search for Credit Card numbers and replace them with token Ids. The mini-Vault 12 will continue to be used to communicate to the Vault 10 to retrieve the token Ids or convert token Ids back to credit card numbers. The caching of numbers locally will be disabled.

The Mini-Vault 12 may utilize the PosFramework component as its base foundation and will maintain a separate mini-Vault project to contain functionality specific to the mini-Vault 12. It is expected that there will be some changes to the PosFramework including an option to prevent logging of certain message types and the addition of a batch adapter component. The mini-Vault 12 can be integrated into existing PosFramework based applications or can be run standalone.

Systems using the mini-Vault 12 may need to integrate the component into their specific infrastructure. For example on a Windows box, additional code may be needed by the POS system to set the java application up as a Windows service.

Communication to the mini-Vault 12 from an interfacing system may utilize the HTTP protocol communicating to a HTTP listener process in the mini-Vault 12. For NPOS & TPOS, there is an option to use existing listeners since the mini-Vault 12 uses a common framework and can be plugged into those existing listeners. When communicating to the mini-Vault 12, messages may contain 3 parts:

1. HTTP Header
2. Message Header
3. Message body

The HTTP header should follow the HTTP 1.1 specifications and more than likely will be handled under the covers in java by using a class like HttpURLConnection. It is important to note that only HTTP Post requests should be accepted with HTTP Get requests being rejected.

If the mini-Vault 12 is running as a standalone application, the following request and response headers should be used. If the mini-Vault 12 is running under an existing framework application, then existing listeners and their corresponding request & response headers can be used.

| Layout | Length | Description |
|---|---|---|
| | | Request Header: |
| "POSREQ" | 6 | fixed text |
| "001" | 3 | header version number |
| xxxxxxxx | 8 | message type indicator (right justified, space filled) |
| xxxx | 4 | store number (right justified, zero filled) |
| xxx | 3 | device number (i.e. register number) (zero filled) |
| 000 | 3 | future use |
| | | Response Header: |
| "POSRESP" | 7 | fixed text |
| "001" | 3 | header version number |
| xxxxxxxx | 8 | message type indicator (right justified, space filled) |
| xxxx | 4 | store number |
| xxx | 3 | device number (i.e. register number) (zero filled) |
| 000 | 3 | future use |
| nnnnnn | 6 | return code (numeric zero filled) |
| x(90) | 90 | response description |
| | | Samples: |
| POSREQ001 | CCNINQ1570900000 | |
| POSRESP001 | CCNINQ15709000000000000OK | |

The Mini-Vault may thus offer several services to support PCI compliance:
 1. Credit Card Number inquiry: this service allows the application to retrieve a credit card number associated with a token Id;
 2. Token Id inquiry: this service retrieves from the Vault 10 real-time (or from its local cache) the associated token Id matching a Credit Card number; and
 3. Cache Credit Card Number: this service enables local caching of the token Id in the mini-Vault 10.

By saving credit card numbers in the mini-Vault 10 when a transaction is completed, it allows the mini-Vault 10 to manage the retrieval and local storage of token Ids in order to increase performance and spread out load on ESB and the Vault 10.

Exemplary message layouts are as follows and should be appended to the message header:

1. Credit Card Number Inquiry (CCNINQ)

This service will return the Credit Card Number associated with a Token Id.

| Request body: | | |
|---|---|---|
| nnnnnnnnnnnnnnnn | 16 | token id |
| | | Response body: |
| xxxxxxxxxxxxxxxxxxx | 19 | credit card number (right justified space filled) |

2. Token Id Inquiry (TNINQ)

This service will return the Token Id associated with a Credit Card Number

| Request body: | |
|---|---|
| xxxxxxxxxxxxxxxxxxx | 19 credit card number (right justified space filled) |
| Response body: | |
| nnnnnnnnnnnnnnnn | 16 token id |

3. Cache Credit Card Number (CCNCACHE)

This service is used to send a Credit Card Number to the mini-Vault 12 so it can be retrieved from the Vault 10 and cached locally. The mini-Vault 12 will manage when a request will be sent to ESB to retrieve. To decrease the number of transactions sent to ESB, the mini-Vault 12 may batch groups of up to 10 credit card number into a single request. Requests to ESB will be triggered when ten credit card numbers have been collected or a time period has expired. The mini-Vault 12 may also check to see if the token has already been retrieved before sending a request to the Vault 10.

Request Body:
xxxxxxxxxxxxxxxxxxx 19 credit card number (right justified space filled)
Response Body:
none To ensure the correctness of the token Id, the LUHN formula, an industry standard algorithm, is used. The check digit is a digit added to a number that validates the accuracy and validity of the number. The check digit is the last digit in the validated number. The bin number portion of the number (first 6 digits) will not be part of the check digit calculation.

The following steps are used to validate a number using the LUHN Mod 10 formula.

Step 1: Starting with the next-to-last digit and moving left, double the value of every other digit. The calculation starts with the next-to-last digit because the last digit is the check digit.

When selecting every other digit, always work right-to-left and do not start with the rightmost digit (since that is the check digit).

The last digit (check digit) is considered #1 (odd number) and the next-to-last digit is #2 (even number). You will only double the values of the even-numbered digits.

Step 2: Add all unaffected digits to the values obtained in Step 1.

If any of the values resulting from Step 1 are double-digits, do not add the double-digit value to the total, but rather add the two digits, and add this sum to the total.

Result: The total obtained in Step 2 must be a number ending in zero (exactly divisible by 10) for the number to be valid.

For example:
2222221374338817
Step 1:

| 2 | 2 | 2 | 2 | 2 | 2 | 1 | 3 | 7 | 4 | 3 | 3 | 8 | 8 | 8 | 7 |
|---|---|---|---|---|---|---|---|---|---|---|---|---|---|---|---|
| 2×2 | | 2×2 | | 2×2 | | 1×2 | | 7×2 | | 3×2 | | 8×2 | | 8×2 | |
| 4 | | 4 | | 4 | | 2 | | 14 | | 6 | | 16 | | 16 | |

Step 2:
4+2+4+2+4+2+2+3+(1+4)+4+6+3+(1+6)+8+(1+6)+7=70

While the foregoing describes various embodiments of the invention in detail, it will be appreciated by those skilled in the art that various modifications and alternatives to those details could be developed in light of the overall teachings of the disclosure. For examples, as software and hardware technologies change and/or improve over time, it is anticipated that such software and/or hardware may be substituted for the software, hardware, communication technologies, etc. set forth above to thereby improve system performances. Accordingly, the particular arrangements disclosed are meant to be illustrative only and not limiting as to the scope of the invention which is to be given the full breadth of the appended claims and any equivalents thereof.

What is claimed is:

1. A system, comprising:
    a vault infrastructure in communication with client-facing applications, the vault infrastructure being configured to receive a credit card number of a credit card;
    a credit card authorization system in communication with the client-facing applications;
    wherein the vault infrastructure is configured to substitute, in real-time, a token id for the credit card number upon receipt of the credit card number from a customer and prior to communication with the credit card authorization system; and
    a mini-vault in communication with a vault of the vault infrastructure, the mini-vault being configured to locally cache token ids and credit card numbers to help distribute calls to the vault over the course of a particular time period.

2. The system according to claim 1, wherein the token id includes a number of digits equal to a number of digits provided to the credit card.

3. The system according to claim 1, wherein the token id includes a bin that is different than a bin of the credit card.

4. The system according to claim 1, wherein the particular time period is a day.

5. The system according to claim 1, wherein the mini-vault resides on a customer-facing system server.

6. The system according to claim 1, wherein the mini-vault communicates with the vault via batch transfers.

7. The system according to claim 1, wherein the cached token ids and the credit card numbers are incapable of being correlated to one another outside of the system.

8. The system according to claim 1, wherein the cached credit card numbers are encrypted.

9. A method, comprising:
    receiving, by a vault infrastructure in communication with client-facing applications, a credit card number of a credit card;
    communicating between a credit card authorization system and the client-facing applications;
    substituting, by the vault infrastructure in real-time, a token id for the credit card number upon receipt of the credit card number from a customer and prior to communication with the credit card authorization system; and
    locally caching, by a mini-vault in communication with a vault of the vault infrastructure, token ids and credit card numbers to help distribute calls to the vault over the course of a particular time period.

10. The method according to claim 9, wherein the token id includes a number of digits equal to a number of digits provided to the credit card.

11. The method according to claim 10, wherein the token id includes a bin that is different than a bin of the credit card.

12. The method according to claim 9, wherein the particular time period is a day.

13. The method according to claim 9, wherein the mini-vault resides on a customer-facing system server.

14. The method according to claim 9, wherein the mini-vault communicates with the vault via batch transfers.

15. The method according to claim 9, wherein the cached token ids and the credit card numbers are incapable of being correlated to one another outside of the system.

16. The method according to claim 9, wherein the cached credit card numbers are encrypted.

\* \* \* \* \*